Figure 36:
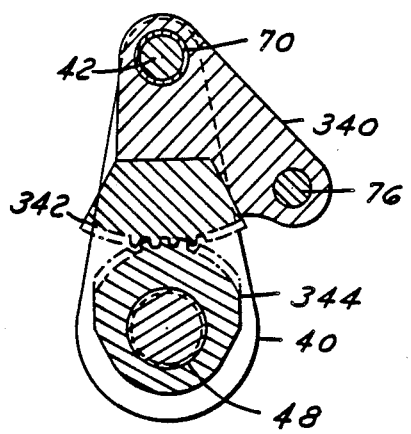

United States Patent [19]
Brems

[11] Patent Number: 4,836,040
[45] Date of Patent: Jun. 6, 1989

[54] DIFFERENTIAL ROTARY-TO-ROTARY CAM SYSTEM TO ACHIEVE LONG DWELL PERIODS WITH CONTINUOUS ROTARY INPUT

[76] Inventor: John H. Brems, 2800 S. Ocean Blvd., Apt. 16-D, Boca Raton, Fla. 33432

[21] Appl. No.: 754,407

[22] Filed: Jul. 12, 1985

Related U.S. Application Data

[63] Continuation of Ser. No. 449,241, Dec. 13, 1982, abandoned.

[51] Int. Cl.⁴ ............................................. F16H 21/12
[52] U.S. Cl. ...................... 74/63; 74/84 R; 74/393; 74/821
[58] Field of Search ............... 74/66, 67, 68, 63, 393, 74/821, 84 R

[56] References Cited

U.S. PATENT DOCUMENTS

| | | | |
|---|---|---|---|
| 1,721,408 | 7/1929 | Perdreau | 74/393 |
| 2,774,245 | 12/1956 | Shepard | 74/84 |
| 2,915,911 | 12/1959 | Hebeler et al. | 74/63 X |
| 3,162,055 | 12/1964 | Littell et al. | 74/84 |
| 3,541,869 | 11/1970 | Deutschlander | 74/63 |
| 3,566,708 | 3/1971 | Brahm | 74/393 |
| 3,835,717 | 9/1974 | Rudolph | 74/63 X |
| 4,202,221 | 5/1980 | Thompson | 74/821 |

FOREIGN PATENT DOCUMENTS 699477 10/1940 Fed. Rep. of Germany ........ 74/393

*Primary Examiner*—Gary L. Smith
*Assistant Examiner*—Vinh Luong
*Attorney, Agent, or Firm*—Barnes, Kisselle, Raisch, Choate, Whittemore & Hulbert

[57] ABSTRACT

A differential rotary-to-rotary cam system to achieve long dwell periods with continuous rotary input including a rotary prime mover of several different types and a differential cam assembly which can be interposed between a particular power input and a power output to produce a repetitive differential motion wherein a long dwell is obtained at the rotary output. This is particularly enhanced when the differential is driven by a basic power system which in itself can produce a dwell in its output motion.

6 Claims, 7 Drawing Sheets

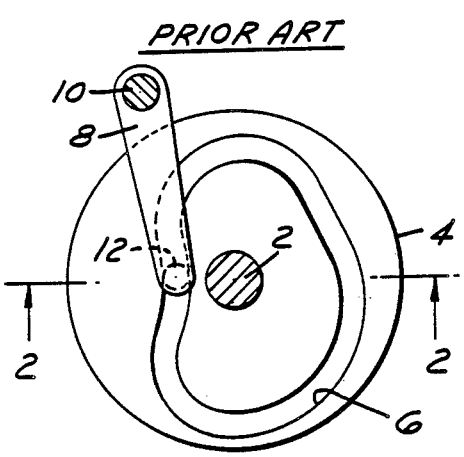
FIG. 1 PRIOR ART
FIG. 2 PRIOR ART
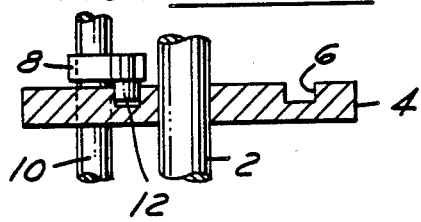
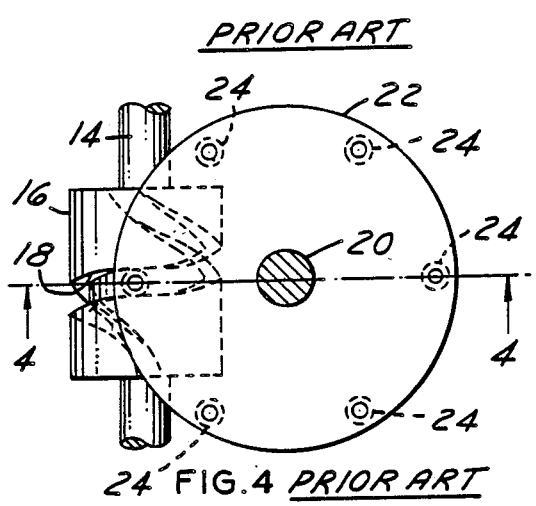
FIG. 3 PRIOR ART
FIG. 4 PRIOR ART
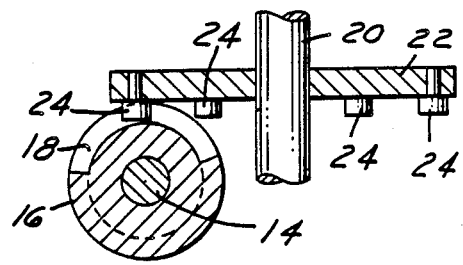
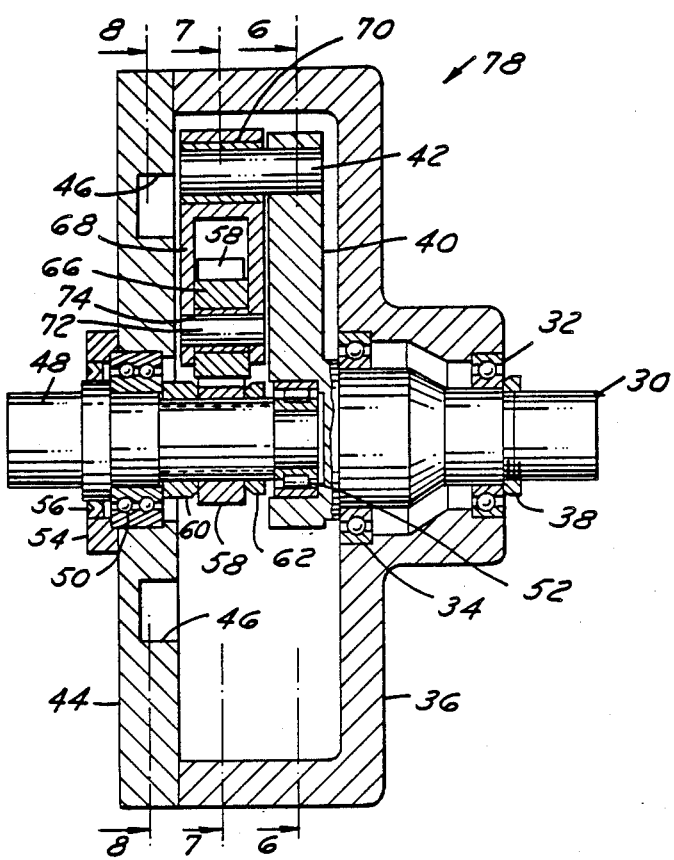
FIG. 5
FIG. 6

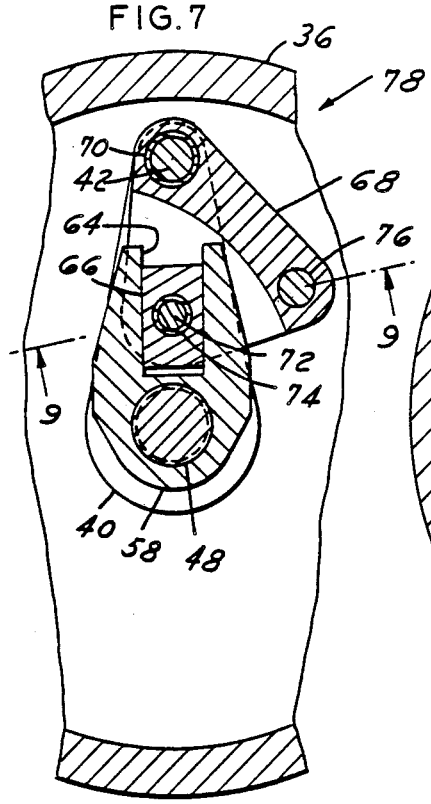
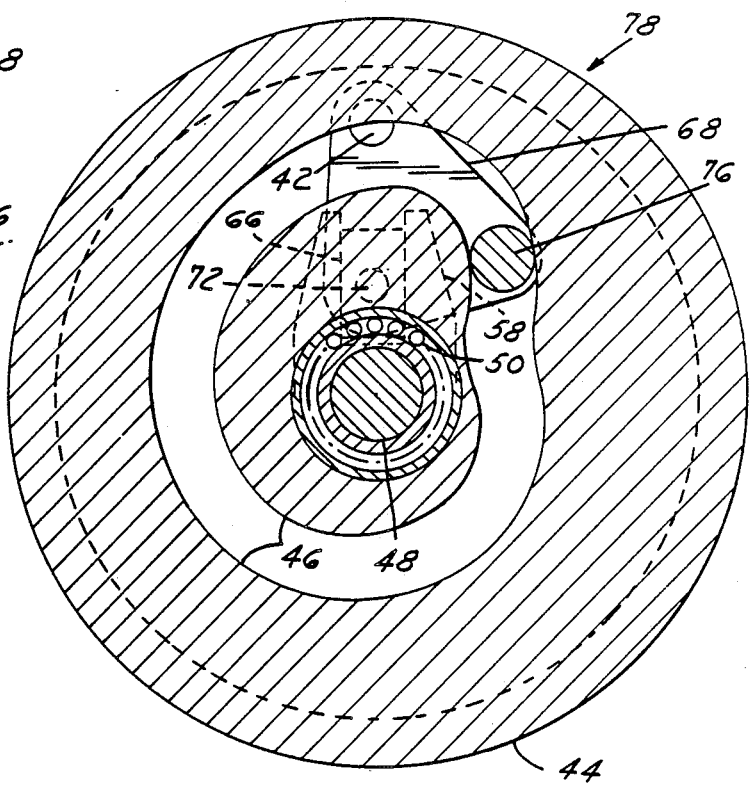
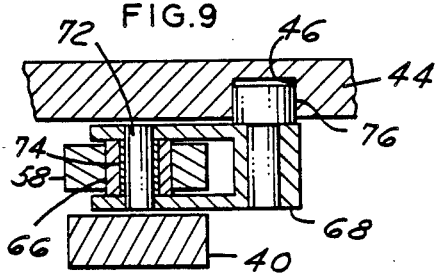
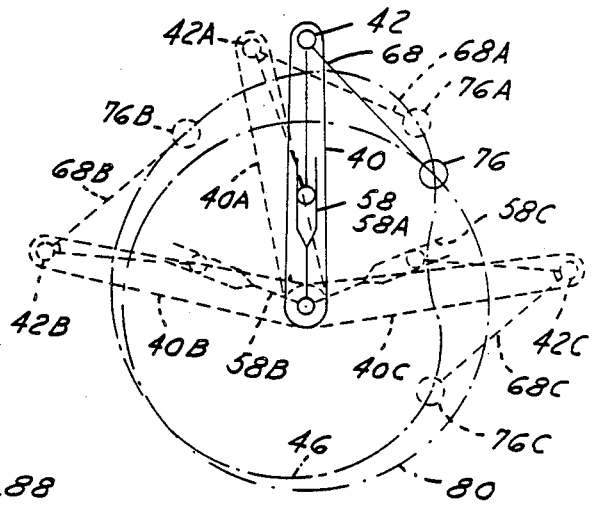
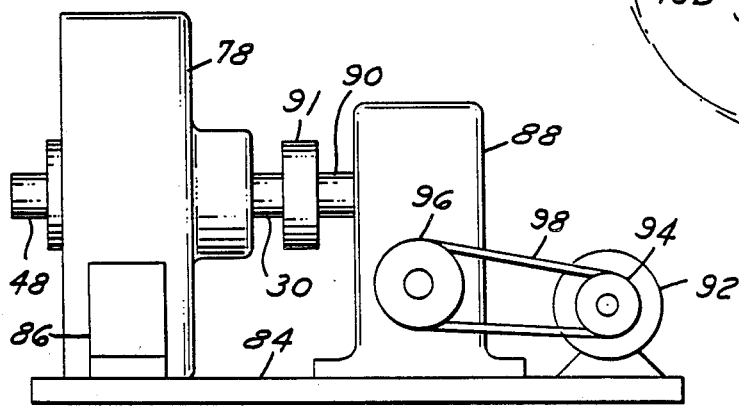

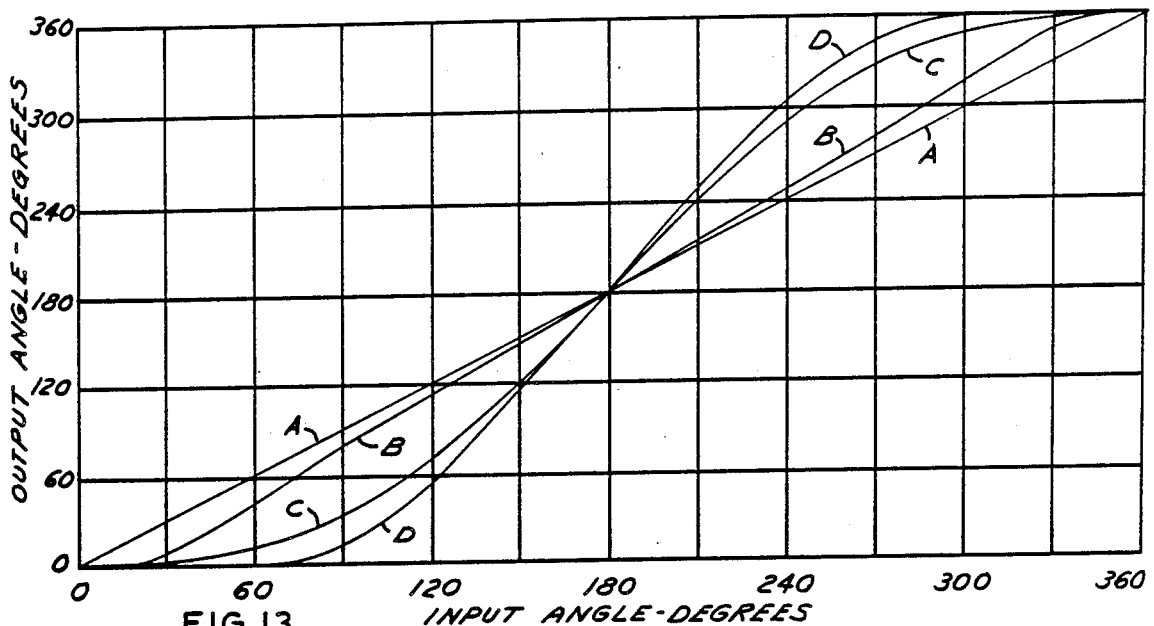
FIG. 12
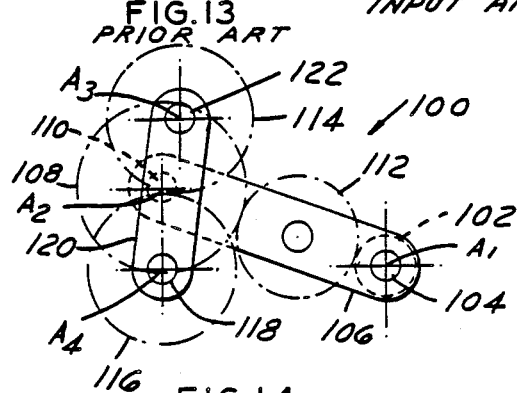
FIG. 13
PRIOR ART
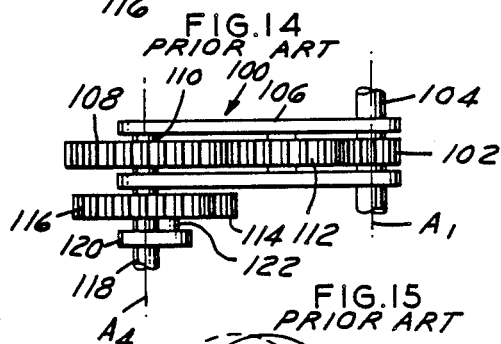
FIG. 14
PRIOR ART
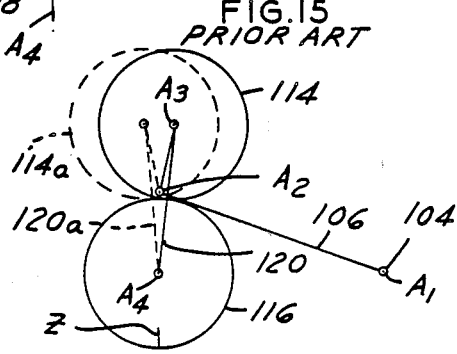
FIG. 15
PRIOR ART
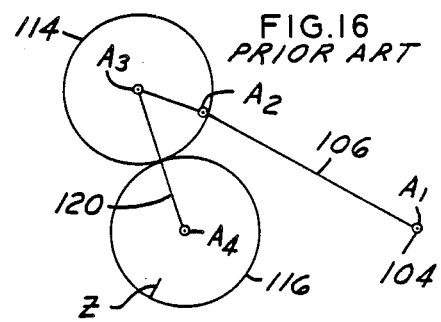
FIG. 16
PRIOR ART
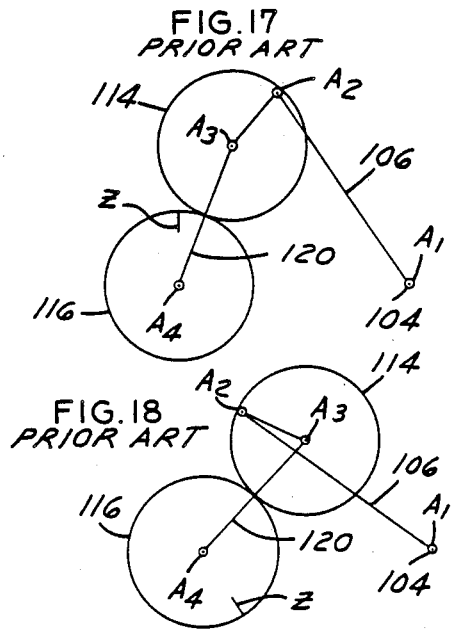
FIG. 17
PRIOR ART
FIG. 18
PRIOR ART

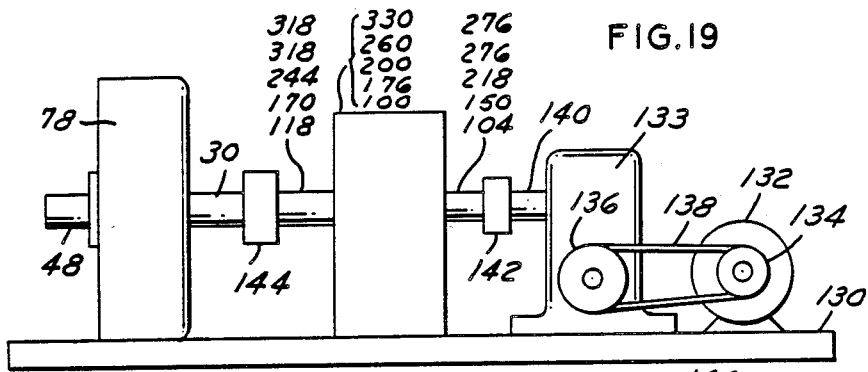
FIG. 19
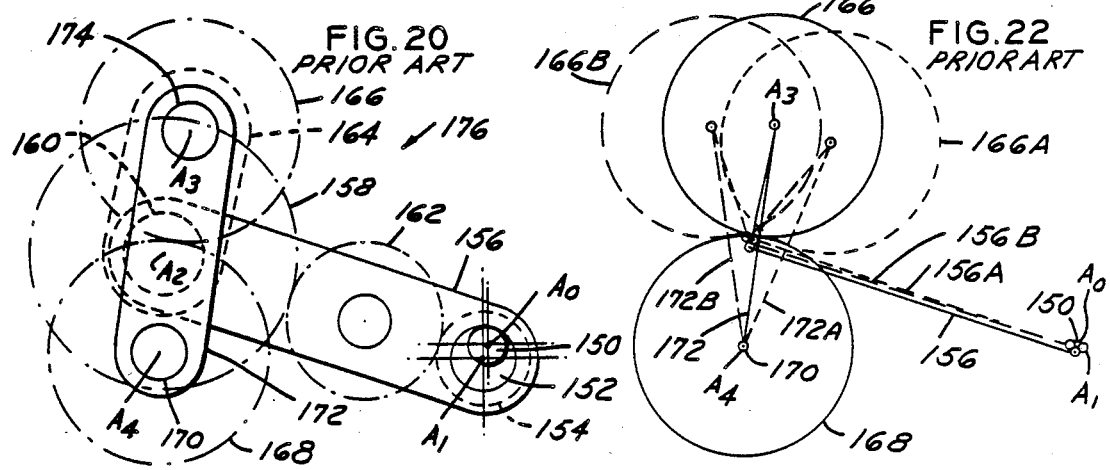
FIG. 20 PRIOR ART
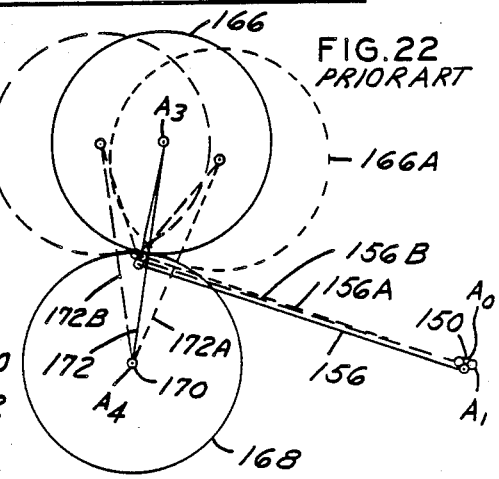
FIG. 22 PRIOR ART
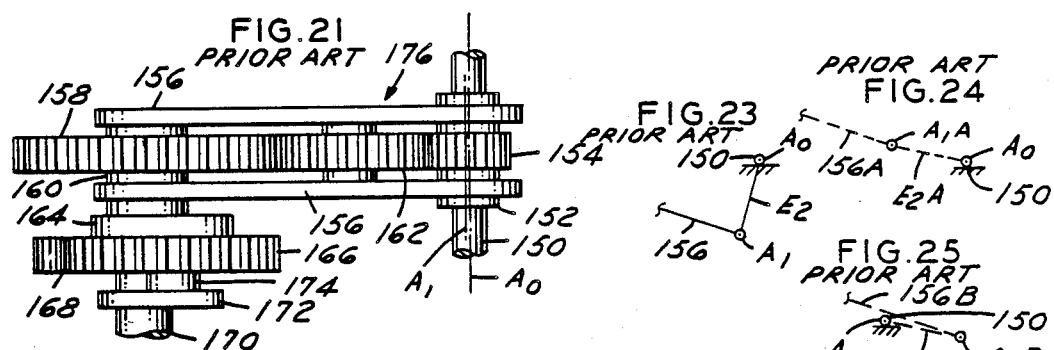
FIG. 21 PRIOR ART
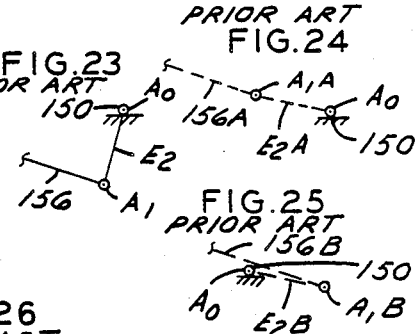
FIG. 23 PRIOR ART
FIG. 24 PRIOR ART
FIG. 25 PRIOR ART
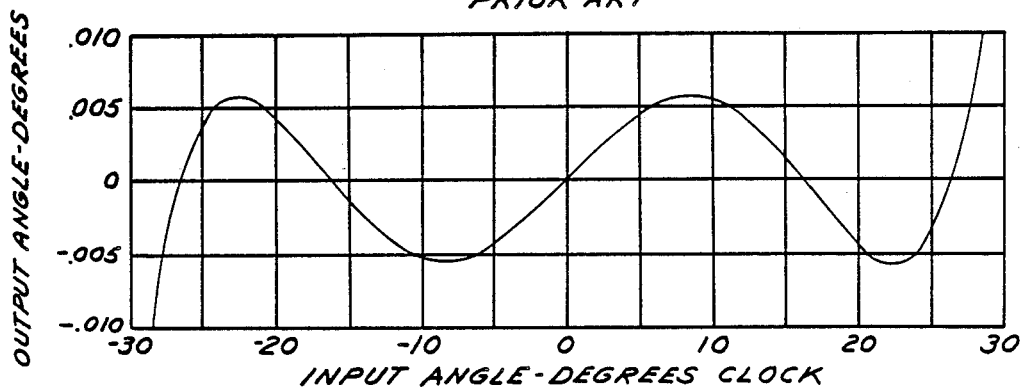
FIG. 26 PRIOR ART

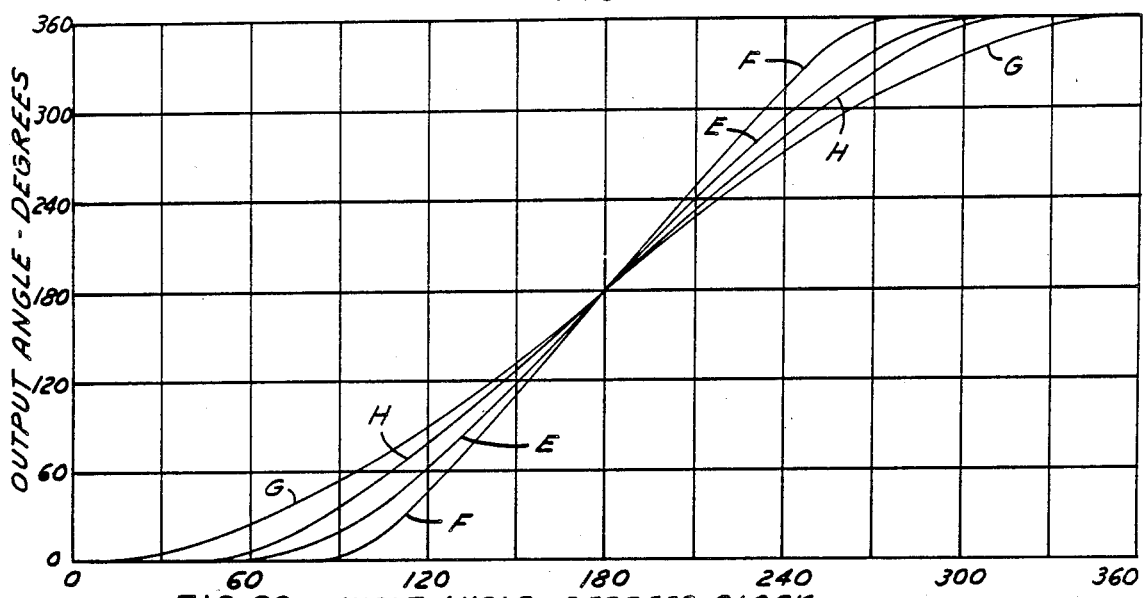
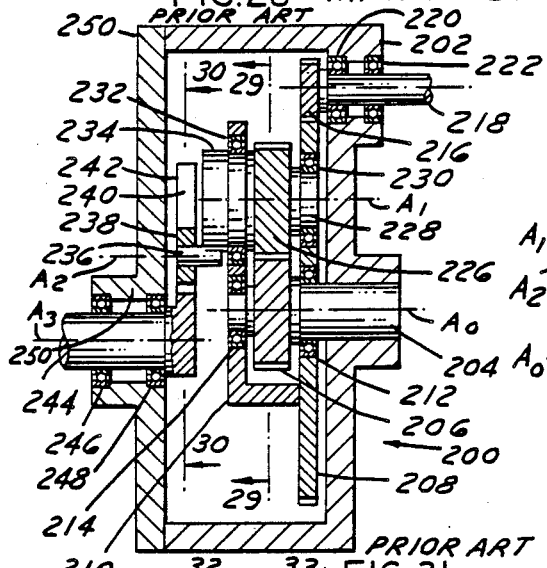
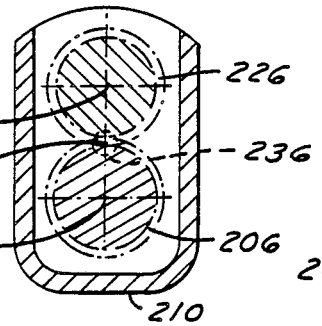
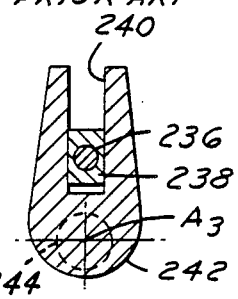
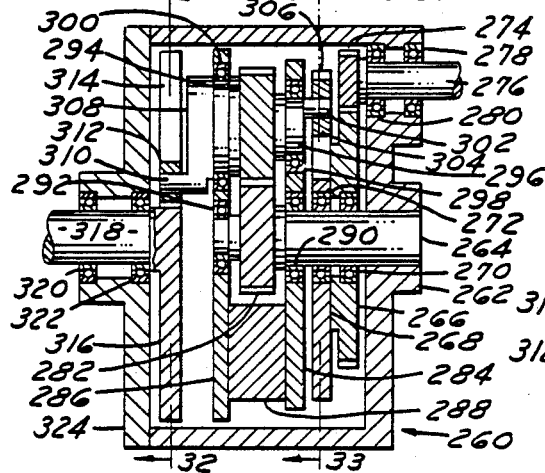
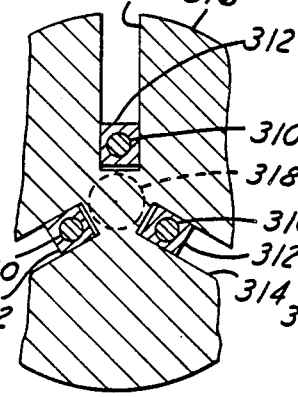
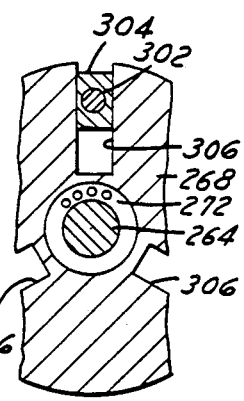

FIG. 34
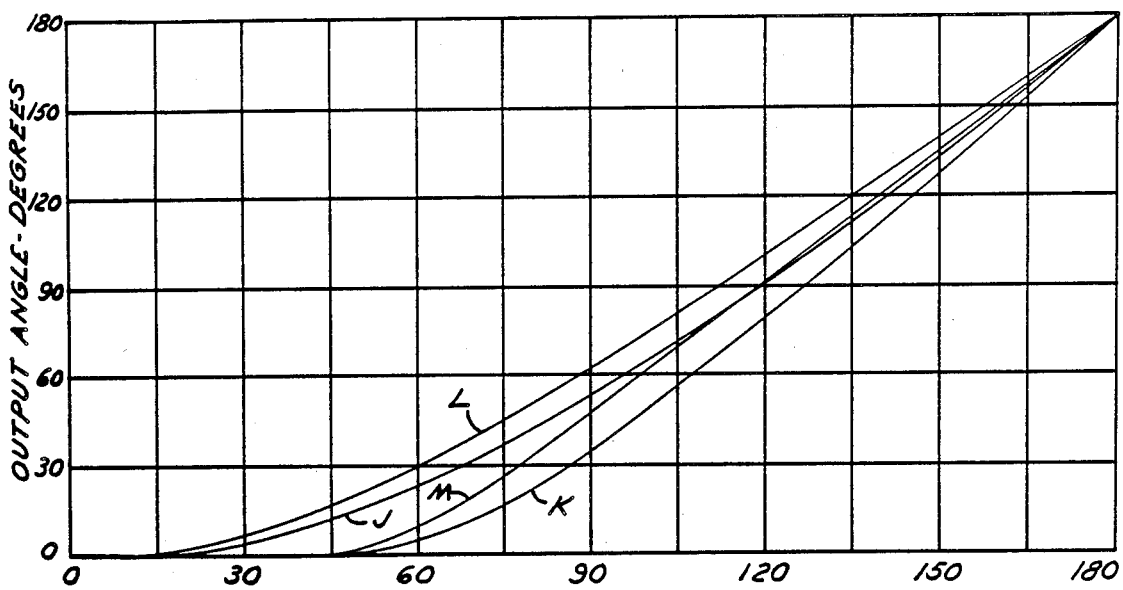
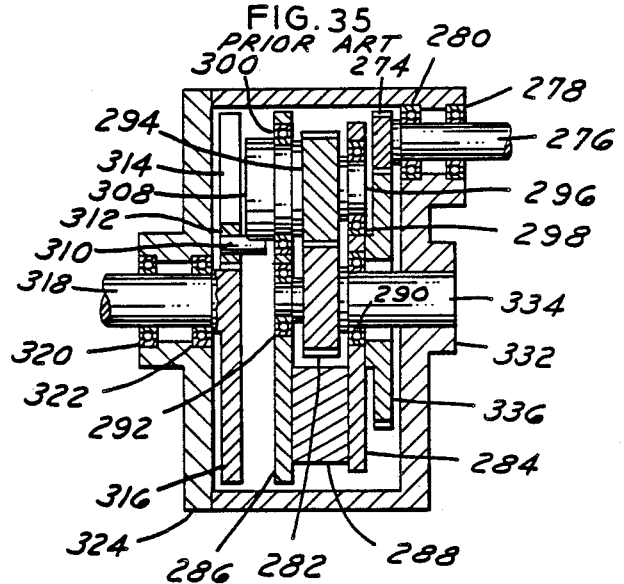
FIG. 35
PRIOR ART

DIFFERENTIAL ROTARY-TO-ROTARY CAM SYSTEM TO ACHIEVE LONG DWELL PERIODS WITH CONTINUOUS ROTARY INPUT

REFERENCE TO RELATED APPLICATION

This application is a continuation of my copending application, Ser. No. 449,241, filed Dec. 13, 1982.

FIELD OF INVENTION

Mechanisms utilizing a rotary prime mover input to produce a controlled output with a dwell pattern.

BACKGROUND OF INVENTION

There arise applications in which it is desired to create a non-uniform angular velocity in the rotation of a shaft, and, more particularly, to have any such predetermined variation repeat itself with each revolution of the shaft.

It is one object of this invention to provide a cam system which can create a variation in the output angular velocity of a shaft, which repeats itself with each revolution of the shaft, and, further, that such variation be created as a differential motion, as opposed to a system in which a cam is the sole connection between the input and output.

There have been disclosed in my U.S. Pat. Nos. 3,730,014 and 4,018,090, and certain embodiments of my U.S. Pat. Nos. 3,789,676 and 4,075,911, acceleration-deceleration systems involving gears or chains and sprockets in which, among other objectives, a momentary stop, a near stop, or a slight displacement reversal could be created in an output shaft for some portion of the overall cycle.

It is another object of this invention to provide a cam mechanism which can be coupled to the output shaft of these basic mechanisms of the aforesaid patents, which can create a true dwell or motionless condition of the system output shaft for a relatively larger portion of an overall cycle, or to accomplish other kinematic variations or objectives beyond the capabilities of the basic mechanisms. This is again accomplished by a differential action of a cam, as opposed to having the entire work pass through the cam system.

Other objectives and features of the invention will be apparent in the following description and claims in which the invention is described and details of the manner and process of using the invention are presented directed to persons skilled in the art, all in connection with the best mode presently contemplated for the practice of the invention.

Figure 37:
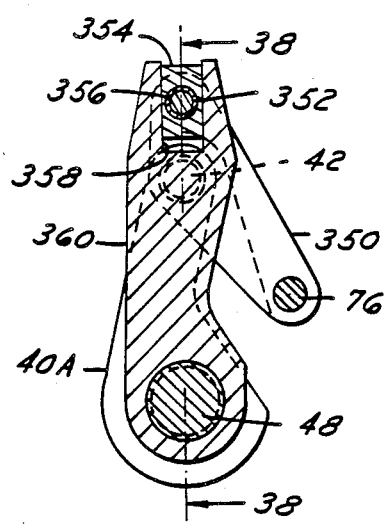
Figure 38:
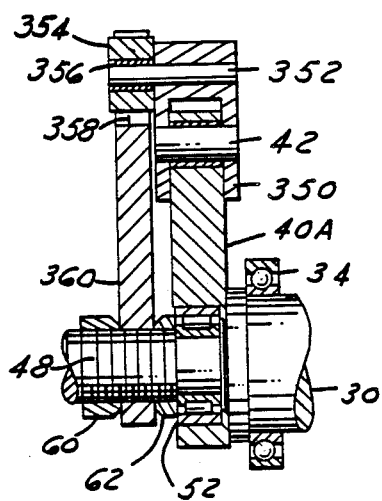

Drawings accompany the disclosure and the various views thereof may be briefly described as:

FIG. 1, a plan view of a conventional prior art plate cam system;

FIG. 2, a transverse section taken on line 2—2 of FIG. 1;

FIG. 3, a plan view of a conventional prior art barrel cam and follower index system;

FIG. 4, a transverse section taken on line 4—4 of FIG. 3;

FIG. 5, a longitudinal section of a mechanism forming a part of this invention and described as a differential cam system;

FIG. 6, a transverse section of the mechanism of FIG. 5 taken on line 6—6;

FIG. 7, a transverse section of the mechanism of FIG. 5 taken on line 7—7;

FIG. 8, a transverse section of the mechanism of FIG. 5 taken on line 8—8;

FIG. 9, a section taken on line 9—9 of FIG. 7;

FIG. 10, a schematic representation of the mechanism of FIG. 5 showing it in a base position and three additional displaced positions;

FIG. 11, an illustrative drive system utilizing the differential cam mechanism of FIG. 5;

FIG. 12, a graph of the displacement characteristics of an illustrative differential cam mechanism, and of a combined mechanism comprised of a cycloidal output mechanism disclosed in my U.S. Pat. No. 3,789,676 and a differential cam mechanism;

FIG. 13, a side view of one embodiment of the mechanism disclosed in my U.S. Pat. No. 3,789,676 for generating an approximate cycloidal output;

FIG. 14, a plan view of the mechanism of FIG. 13;

FIGS. 15–18, schematic drawings of principal elements of the mechanism of FIG. 13 shown in five positions during an index cycle;

FIG. 19, an illustrative drive system utilizing the differential cam mechanism driven by one or the other of illustrative indexing mechanisms including the mechanism of FIG. 13;

FIG. 20, a side view of one embodiment of the mechanisms disclosed in my U.S. Pat. No. 4,075,911 for generating intermittent long dwell index cycles;

FIG. 21, a plan view of the mechanism of FIG. 20;

FIGS. 22–25, schematic drawings of principal elements of the mechanism of FIG. 20 shown in three positions during the dwell portion of a cycle;

FIG. 26, a graph of the dwell characteristics of the specific but illustrative mechanism of FIG. 20;

FIG. 27, a graph of the displacement characteristics of the differential cam mechanism combined with two different indexing mechanisms;

FIG. 28, a longitudinal section of the mechanism disclosed in U.S. Pat. No. 4,018,090;

FIG. 29, a transverse section taken on line 29—29 of FIG. 28;

FIG. 30, a transverse section taken on line 30—30 of FIG. 28;

FIG. 31, a longitudinal section of one of the mechanisms disclosed in my U.S. Pat. No. 3,730,014;

FIG. 32, a transverse section taken on line 32—32 of FIG. 31;

FIG. 33, a transverse section taken on line 33—33 of FIG. 31;

FIG. 34, a graph of the displacement characteristics of the differential cam mechanism combined with two additional indexing mechanisms;

FIG. 35, a longitudinal section of a mechanism similar to the mechanism of FIGS. 31-33 but having no input eccentricity;

FIG. 36, a section, analogous to FIG. 7, showing an alternate bell crank link coupling utilizing sector gears;

FIG. 37, a section, analogous to FIG. 7, showing an alternative inverted bell crank link connection;

FIG. 38, a section taken on line 38—38 of FIG. 37; and

Figure 39:
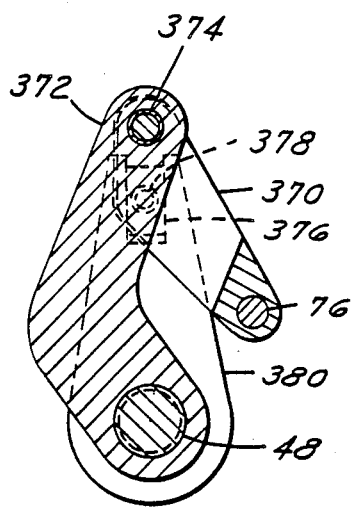

FIG. 39, a section, analogous to FIG. 7, showing an alternative reversed bell crank link connection.

Cam systems as a general class, and viewed as work transfer systems, or as means of transferring work according to a predetermined variable movement ratio, have the entire work being transferred from the input to the output pass through the cam and follower elements. The term "work" is used in the accepted classical sense in which:

Work = Force × Distance or

Work = Torque × Angular Displacement (Radians)

FIGS. 1 and 2 illustrate a widely used plate cam and roller follower system comprised of an input shaft 2 rotatable in external bearings (not shown) on which is mounted a plate cam 4 in which is cut a contoured cam groove 6, whose variation from a base circle is a function of the output motion desired. A cam follower arm 8 is mounted on an output shaft 10 substantially parallel to input shaft 2 and also rotatable in external bearings, not shown. A cam follower roller 12 is mounted in the arm 8 and operates in the cam groove 6. It can be seen that, as the input shaft 2 is rotated by an external power source at a given angular velocity, the output shaft 8 will oscillate according to the movement characteristics designed into the cam groove 6.

Moreover, it can be seen that, neglecting friction, the output work over any arbitrarily small time interval, must equal the input work; that is, Output Torque × Output Angular Increment must equal Input Torque × Input Angular Increment. This work must also be equal to the force on the cam roller multiplied by the distance through which it is moved by the cam groove, in any given small cam rotation increment.

Another widely used cam system employing a cylindrical or barrel cam is shown in FIGS. 3 and 4. An input shaft 14, supported in external bearings, has mounted on it a cylindrical cam 16 in which is cut a contoured circumferential cam groove 18. An output shaft 20, also operating in external bearings, has mounted on it a follower plate 22, on which are mounted a series of cam follower rollers 24, which operate in the cam groove 18. As shown, when one roller 24 exits the cam groove 18, another roller 24 enters the other end of the same groove. This type of system can be used to provide a constant indexing of the shaft 20, or, if the groove 18 closes on itself and only a single roller 24 is employed, it can be used to provide a predetermined oscillation of the shaft 20. In either case, the output work, as previously described, equals the input work, neglecting friction, and this work is again equal to the force on the cam follower multiplied by the distance through which the follower is moved by the cam groove, in any given small cam increment. In other words, all of the work is transferred through the cam and follower in these typical systems.

The cam and cam followers briefly described in FIGS. 1-4 are illustrative only. There are known in the art many other types of cam systems using male bands as well as female grooves, and flat or contoured followers in place of the rollers shown. But in each instance, the work supplied by the input shaft is transmitted to the output system through the cam and follower elements.

A different type of cam system is shown in FIGS. 5-9. Referring to these figures, an input shaft 30 is mounted in bearings 32 and 34 supported in a housing 36, and held in place by a nut 38. A crank arm 40 is made integral with the input shaft 30 or rigidly fastened thereon; at its outer end the crank arm 40 carries a crankpin 42 on an axis substantially parallel to the axis of the input shaft 30.

A cover plate 44 is bolted to the housing 36 to complete the mechanism enclosure; a cam groove 46 is cut into the plate 44 and forms a closed curve around the input shaft axis. An output shaft 48 is mounted in a bearing 50 mounted in the cover plate 44 and in a bearing 52 in the input shaft 30. The bearing 50 is retained in the cover plate 44 by a retainer ring 54 which also carries a seal 56 operating on the output shaft 48. An output arm 58 is splined to the output shaft 48 and axially positioned thereon through a spacer 60 and nut 62. The output arm 58 has formed in it a slot 64 (FIG. 7) into which is closely fitted a slider block 66 which can slide therein along a substantially radial line.

A bellcrank link 68, triangular in outline, and U shaped in section to straddle the output arm 58 and slider block 66, is used to connect the input crank arm 40 to the output arm 58 as follows. At its apex, the bellcrank link 68 is pivoted on the crankpin 42 through a bushing 70. At the end of one leg, the bellcrank link 68 is connected to the slider block 66 through pivot pin 72 and bushing 74; and at the end of the other leg, the bellcrank link 68 carries a cam follower roller 76 and this roller operates in the cam groove 46 in the cover plate 44. The entire mechanism enclosed in the housing 36 and cover plate 44 will be referred to as the differential cam mechanism 78.

It can be seen that if it is presumed that the bellcrank link 68 is stationary with respect to the crank arm 40 that there is no relative motion between the crank arm 40 and the output arm 58, and if it is further presumed that the input shaft 30 is rotated at some given angular velocity, that the output shaft 48 will rotate in exact synchronism with the input shaft, and that under these presumptions, the path traced by the cam follower roller 76 will be a true circle concentric about the axis of the input shaft. Conversely, it can also be seen that if the cam groove 46 is a true circle about the axis of the input shaft, there is no relative motion of the bellcrank link 68 with respect to the crank arm 40, and therefore no relative motion is generated between the input and output shafts, and the output shaft rotates in exact synchronism with the input shaft. If, under these hypothetical conditions, torque and work is required by an external load on the output shaft, this torque and work must be supplied by the input shaft, but the work will be transmitted directly from the input shaft to the output shaft without passing through the cam and cam follower. This must be so since it was shown that the bellcrank link does not move relative to the input arm and hence can contribute no work.

The conditions of movement and work transfer with an illustrative contoured cam groove can be visualized through FIG. 10 which shows the essential system elements schematically at several representative angles in a one-revolution cycle. Only the centerline of the cam groove 46 is shown, together with a circular "base" circle 80 from which the actual cam follower position can be judged. The cam groove centerline 46 in FIG. 10 corresponds to the cam groove 46 illustrated in FIG. 8, and the position of the essential elements, shown in solid lines and without suffix, correspond to their positions in FIGS. 5-9; this is the arbitrary starting position of the mechanism.

The position reached by the mechanism after the input shaft and crank arm 40 have rotated approximately 12° counterclockwise from the starting position is shown by the elements in dotted schematic having the suffix letter A. The crank arm has reached the position 40A and the bellcrank link has reached the position 68A as driven by the cam follower 76A in cam groove 46. It will be noted that the output arm 58 has not moved, since the positions 58 and 58A are coincident. This situation is created by the fact that the illustrative cam groove 46 was designed to achieve exactly this result; i.e., that a portion of the movement of the crank arm 40 on either side of its starting position would result in no output movement of the output arm 58.

As the crank arm 40 rotates further counterclockwise, with the cam roller 76 confined to follow the cam groove 46, the relative rotation of the bellcrank link with respect to the crank arm slows down causing the output arm 58 to accelerate counterclockwise. At the maximum radius of the cam groove 46, this relative rotation ceases and the output arm rotates at the same angular velocity as the crank arm, though it is still lagging in displacement.

After the crank arm has rotated approximately 80° from the starting position, a position is reached as shown by the elements having the suffix letter B. Since the cam groove 46 when engaged by the cam follower roller 76B has a greater radius than the base circle 80, the output arm 58B still lags the crank arm 40B, but, since the radius of the cam groove 46 is decreasing, the output arm 58B is now moving at a greater angular velocity than the crank arm 40B.

It should also be noted that where the cam groove 46 recrosses the base circle 80, the bellcrank link has the same relative position with respect to the crank arm as it had at the starting position and hence the output arm has "caught up" with the crank arm.

After the crank arm has rotated approximately 280° from the starting position, a position is reached as shown by the elements having the suffix letter C. Here the cam groove 46, where engaged by the cam follower roller 76C, has a smaller radius than the base circle 80, and it can be seen that the bellcrank link has forced the output arm 58C ahead of the crank arm 40C. Furthermore, since the cam groove 46 is still becoming smaller in radius, the output arm 58C is still moving ahead of the crank arm 40C. This continues until the minimum radius of the cam groove is reached by the cam follower roller 76C at which point the output arm and the crank arm rotate at the same angular velocity.

From the foregoing qualitative description of the operation of the mechanism, the following broad deductions may be reached:

1. In the absence of any movement input from the cam, work is transferred directly from the crank arm to the output arm, without any work contribution from the cam system. This situation exists whenever the cam groove has a portion of constant radius.

2. In those areas where the cam groove has an increasing radius, the output arm is moving more slowly than the crank arm, and the cam system is absorbing work from the crank arm.

3. In those areas where the cam groove has a decreasing radius, the output arm is moving faster than the crank arm, and the cam system is adding work to the output, but the proportion of work provided by the crank arm is equal to the ratio of the angular velocity of the crank arm to the anglular velocity of the output arm.

4. Over any 360° interval of rotation of the crank arm, the output arm also rotates 360° because the cam follower roller starts and finishes at the same point on the cam, hence the crank arm and output arm have the same relative positions at the beginning and end of one revolution.

5. In a general sense, the cam system provides differential movement and work between the input and output, rather than being the sole means of transferring movement and work from the input to the output. It adds and subtracts from the input to achieve the output and therefore in many applications, the amount of work it must absorb or deliver is very small compared to the total amount being transferred from the input to the output over any given revolution. Practically, this means that the cam will be physically smaller and less expensive than a cam system such as shown in the prior art section through which the total work must pass.

This cam system can be utilized in a variety of ways, as will be illustrated. FIG. 11 shows a simple arrangement in which the input shaft is rotated at constant velocity. The cam mechanism 78 is mounted to a base 84 through a cradle bracket 86. A worm gear reducer 88 is also mounted on the base 84; its output shaft 90 is coupled to the input shaft 30 of the cam mechanism through a coupling 91. An electric motor 92 is also mounted on the base 84 and drives the gear reducer 88 through pulleys 94 and 96 and belt 98.

The performance of this differential cam system, with the input shaft 30 rotating at constant velocity, is shown in FIG. 12. The curve A represents the rotation of the input shaft 30 and is drawn as a reference only. Curve B represents the rotation of the output shaft 48, and is based on the cam groove contour shown in FIGS. 8 and 10. In essence, the differential cam system provides a dwell of the output for about 12° on either side of the starting position with a smooth transition to an approximately constant velocity extending from approximately 70° to 290° where this approximately constant velocity is slightly greater than the constant velocity of the input shaft.

While this differential cam system is shown with a cam groove configured to provide a short dwell of the output shaft once during each revolution, it can also be configured to provide a wide variety of kinematic functions within its angular displacement capacity range, and within the limits of good cam rise and cam follower pressure angles. In the scale of the embodiment of FIGS. 5 to 9, it is possible for the output shaft to lag or lead the input shaft by approximately 21° although this can be altered by changing the proportions of the bellcrank link.

This differential cam system can be utilized by itself as described in connection with FIG. 11; but it has special merit when used in conjunction with other already existing mechanical systems as will be illustrated.

FIGS. 13 and 14 are simplified schematic drawings of one embodiment of an approximate cycloidal motion generating mechanism 100 from my U.S. Pat. No. 3,789,676. An input gear 102 is mounted on an input shaft 104 which is journalled in a suitable housing or frame on axis $A_1$ and driven by an appropriate external drive system. Also journalled on the input shaft 104 is a tangential link 106 which oscillates thereon as will be described. A driving gear 108 is mounted on a shaft 110 journalled in the outboard end of the link 106 on axis $A_2$, and an intermediate gear 112, also journalled in the link 106, is formed to mesh with the input gear 102 and driving gear 108. An eccentric gear 114 is mounted on the shaft 110 with an eccentricity approximately equal to its pitch radius. This eccentric gear 114, rotating on a moving axis $A_3$, meshes with an output gear 116 mounted on a shaft 118 also journalled in the housing or frame on axis $A_4$. A radial link 120 is also journalled on the output shaft 118 at its one end; at its other end, the radial link 120 is journalled to a stub shaft 122 on axis $A_3$ mounted concentrically on the eccentric gear 114. It is the purpose of this radial link 120 to keep the eccentric gear 114 in mesh with the output gear 116 as the eccentric gear 114 moves through its rotational and translational path.

When the mechanism is in the position shown in FIG. 13, it is in a natural dwell position, i.e., a small rotation of the input gear 102 causes a corresponding rotation of the driving gear 108 and the eccentric gear 114. This rotation of the eccentric gear 114 is accompanied by a corresponding movement of the shaft 122 about the output shaft 118, such that the gear 114 literally rolls about the output gear 116 which remains stationary or in dwell.

A qualitative schematic representation of the motion of the output gear 116 during a complete 360° rotation of the driving gear 108 and eccentric gear 114, at 90° intervals, is shown in FIGS. 15–18. An arbitrary radial marker line Z has been added to the output gear 116 to show its position change at these intervals. FIG. 15 shows the position of all gears at the center of the dwell, which is the same configuration as shown in FIG. 13. Additionally, a second position is shown in which the driving gear 108 and eccentric gear 114 have been rotated 10° counterclockwise (as driven by intermediate gear 112 and input gear 102). The rolling action of the gear 114 on the output gear 116 which remains substantially stationary during this 10° interval can therefore be visualized. In this second position, the components are redesignated by the call out suffix letter a.

As the gears 108 and 114 continue to rotate counterclockwise, the output gear 116 is accelerated and moves in the clockwise direction. After 90° of this rotation of gears 114 and 108, the position shown in FIG. 16 is reached. At this point, the acceleration of gear 116 in the clockwise direction has reached its approximate maximum, and the velocity of the gear 116 in the clockwise direction is approximately equal to its average velocity.

As the gears 108 and 114 continue their rotation counterclockwise from their position shown in FIG. 16, the output gear 116 continues to accelerate, at a decreasing rate, in the clockwise direction. After an additional 90° of rotation of gears 114 and 118, the positions shown in FIG. 17 is reached. At this point, the acceleration of the gear 116 has substantially returned to zero, and its velocity in the clockwise direction has reached an approximate maximum which is approximately double the average velocity.

As the gears 108 and 114 continue to rotate counterclockwise from the position shown in FIG. 17, the output gear 116 continues to rotate clockwise but is decelerating. After an additional 90° of rotation of gears 108 and 114, or a total of 270° from the start of the cycle, the position shown in FIG. 18 is reached. At this point, the deceleration of the output gear 116 is at or near maximum, while the velocity of the output gear 116, still in the clockwise direction, has slowed down to approximately its average velocity.

As the gears 108 and 114 continue to rotate counterclockwise from the position shown in FIG. 18, the output gear 116 continues to rotate clockwise, but is still decelerating, though now at a decreasing rate. After an additional 90° of rotation of gears 108 and 114, or a total of 360° from the start of the cycle, the position shown in FIG. 15 is again reached, with the output gear 116 having completed one revolution and is now again in dwell.

It can be seen, therefore, that as the input gear 102 is driven by some external power means at a substantially constant angular velocity, the gears 108 and 114 are driven by the intermediate gear 112. Gears 108 and 114 have an angular velocity which is determined by the superposition of the effect of the oscillation of link 106 about shaft 104 on the velocity created by the input gear 102 so gears 108 and 114 do not rotate at a constant angular velocity. And the oscillation of the gear 114 along the arcuate path controlled by radial link 120 and created by its eccentric mounting on shaft 110 creates another superposition on the velocity of the output gear 116. With the proportions shown in FIGS. 13–18, the output gear 116 will come to a complete stop or dwell once in each revolution, since the pitch diameters of gears 114 and 116 are shown as being equal.

With the mechanism shown in FIG. 13, the output motion of gear 116 has the broad characteristics of cycloidal motion, but slight distortions exist which are caused by the short length of link 106 and the arcuate rather than linear path of shaft 122. To some degree, these distortions can be compensated for by the proper choice of gear ratio between input gear 102 and driving gear 108 and the ratio of the length of link 106 to the center distance between input shaft 104 and output shaft 118.

In order to determine the exact quantitative kinematic characteristics of the mechanism shown in FIG. 13, it is necessary to use numerical methods for which a programmable calculator or computer is a great convenience, but not a necessity. Setting up classical equations of motion and then differentiating to find velocity and acceleration is excessively laborious and time consuming. But numerical calculation for the exact determination of the output shaft position for a series of discrete positions of the input shaft can be accomplished using straightforward geometry and trigonometry. By making these calculations at sufficiently small intervals, it becomes possible, by numerical differentiation, to obtain the velocity, and then by numerically differentiating a second time, to obtain the accelerations. These calculations can be repeated as required for different values of the geometrical parameters to very closely approximate the conditions to be described below.

Pure cycloidal motion displacement in unitized coordinates and using radian angular notation is given by:

$$S = \frac{1}{2\pi}(2\pi t - \sin 2\pi t) \qquad (1)$$

where t is the input variable having a range of 0 to 1 for one cycle of cycloidal motion, and S is the output displacement, also having a range of 0 to 1.

If degree notation is used and for an input angle and output angle range through one revolution of 360°, equation (1) may be rewritten:

$$\theta_o = \theta_i - \frac{360}{2\pi}\sin\theta_i \qquad (2)$$

where

-continued $\theta_o$ = output angle in degrees (shaft 118)

$\theta_i$ = input angle in degrees $\left(\frac{\text{shaft } 104}{3}\right)$

The relationship of equation (2) is plotted as curve C of FIG. 12; and represents the functional output of the mechanism 100 of FIGS. 13 and 14. It will be noted that there is a very slow initial rise of the output from the starting point of both input and output, which can be more easily discerned from the following table:

| Input Angle | Output Angle |
| --- | --- |
| 0° | 0 |
| 10° | .05° |
| 20° | .40° |
| 30° | 1.35° |
| 40° | 3.17° |
| 50° | 6.11° |
| 60° | 10.38° |
| 70° | 16.16° |

This relatively slow initial rotation of the output of mechanism 100 can be converted to a long true dwell with no output movement, by connecting the input shaft 30 of the differential cam mechanism 78 to the output shaft 118 of the mechanism 100. This is schematically shown in FIG. 19.

A base 130 supports a motor 132, gear reducer 133, accelerating-decelerating mechanism 100, and differential cam mechanism 78. The motor 132 drives the gear reducer 133 through pulleys 134 and 136 and belt 138. The output shaft 140 of the gear reducer 133 is coupled to the input shaft 104 of the accelerating-decelerating mechanism 100 through coupling 142; and the output shaft 118 of the accelerating-decelerating mechanism 100 is coupled to the input shaft 30 of the differential cam mechanism 78 through coupling 144. The effect of the differential cam mechanism 78 is therefore superimposed on the normal output of the accelerating-decelerating mechanism 100. If the input shaft of the overall system is considered to be the shaft 104, and its rotation "scaled" so that a full cycle of the mechanism equals 360° and the output shaft is 48, the input to output characteristics are shown by curve D in FIG. 12. It will be noted that an overall true dwell in excess of ±60 has been achieved on either side of the starting point. This, of course, presumes that the connection of the two mechanisms is made with both mechanisms at their starting or zero position, i.e., that they are properly phased. Dwells of this magnitude are very useful in various mechanically interrelated operating systems.

Another example of a combination system will be based on one embodiment of a flexible motion generating mechanism utilizing higher harmonics as disclosed in my U.S. Pat. No. 4,075,911. FIGS. 20 and 21 are simplified schematic drawings of this embodiment which is again proportioned to provide a 360° output for one acceleration deceleration cycle of its output shaft. Referring to FIGS. 20 and 21, an input shaft 150 rotates on axis $A_0$ in stationary bearings in a case which is not shown. An eccentric segment 152, on the shaft 150, is concentric about an axis $A_1$ displaced a small amount from the axis $A_0$. An input gear 154, fastened on the eccentric segment 152, is also concentric about axis $A_1$. Tangential links 156 are journalled on the eccentric segment 152. A driving gear 158 is mounted on a shaft 160 journalled in the tangential links 156 and rotates on a moving axis $A_2$; it is driven by the input gear 154 through an intermediate gear 162 also journalled in the tangential links 156. In this instance the ratio between the input gear 154 and the driving gear 158 is exactly 3:1; i.e., the input gear 154 rotates three times for every revolution of driving gear 158.

An eccentric plate 164 is mounted on the shaft 160 and in turn supports an eccentric gear 166 concentric about a moving axis $A_3$. This eccentric gear 166 meshes with an output gear 168 mounted on an output shaft 170 rotating on a stationary axis $A_4$ in bearings mounted in the case not shown. The eccentric gear 166 and the output gear 168 are equal in size to provide the 360° output cycle. The eccentric gear 166 is held in mesh with the output gear 168 by a radial link 172 which is journalled on the output shaft 170 and on a stub shaft 174 mounted on the eccentric gear 166 concentric about axis $A_3$.

It can be seen that the mechanism of FIGS. 20 and 21 is similar to the mechanism of FIGS. 13 and 14, differing only in the addition of an eccentricity between the input shaft 150 on axis $A_0$ and the input gear 154 together with the journal supports for the tangential link on axis $A_1$. The distance from axis $A_0$ to axis $A_1$ will be defined as eccentricity $E_2$, while the eccentricity between axis $A_2$ and axis $A_3$ is defined as eccentricity $E_1$. The addition of this second eccentricity $E_2$, which rotates at an integral multiple number of times for each rotation of the eccentricity $E_1$, makes it possible to achieve a wide variety of kinematic effects on the rotation of the output shaft 170. This is disclosed in considerable mathematical detail in my existing U.S. Pat. No. 4,075,911.

The mechanism of FIGS. 20 and 21, designated mechanism 176, is configured to create a relatively long dwell in terms of input angle rotation, in which the dwell is not a true stationary condition of the output shaft, but rather, multiple small amplitude oscillation of the output shaft about the center of these oscillations, which is defined as the zero point for output angle measurement. For clarity, the eccentricity $E_2$ between axis $A_0$ and $A_1$ has been exaggerated several fold in the scale of the FIGS. 20 and 21.

The qualitative behavior of the system near dwell is shown in FIGS. 22–24. At the starting point, or center of dwell, the primary elements are shown in solid lines in FIG. 22 and are labeled without subscript. Since the axes $A_0$ and $A_1$ are so close when drawn to scale, FIG. 23 shows their relationship when the scale is expanded 20 times. If, from this starting position, the input shaft is rotated 90° clockwise, the relative position of the elements is shown by dotted lines and the suffix label "A"; here the position of $E_2A$ is shown in expanded scale in FIG. 24. Similarly, if the input shaft is rotated 90° counterclockwise, the relative position of the elements is shown by dashed lines and the suffix letter "B"; and here the position of $E_2B$ is shown in expanded scale in FIG. 25. Throughout this movement range of the input shaft the movement of the output gear is too small to be shown diagrammatically. In effect the eccentric gear 166 rolls on a nearly stationary output gear 168.

Quantitatively, the movement of the output gear 168 is shown graphically by the curve of FIG. 26. The data for this curve were obtained by the methods and formulas disclosed in my U.S. Pat. No. 4,075,911. The clock angle is the true input angle divided by three since the gear ratio between gears 154 and 158 is 3:1 and therefore it takes three revolutions of the input gear 154 to complete one cycle which is represented by 360 "clock" degrees.

The output displacement of the output gear 168 and output shaft 170 is shown for a complete cycle by the curve E in FIG. 27. Since this curve is very flat on either side of the starting point, the following table enumerates the output movements in these areas.

| Input Angle Degrees Clock | Output Angle Degrees |
|---|---|
| 0 | 0 |
| 10 | .005 |
| 20 | −.004 |
| 30 | .020 |
| 40 | .246 |
| 50 | .994 |
| 60 | 2.739 |
| 70 | 6.072 |
| 80 | 11.604 |
| 280 (−80) | 347.933 (−12.067) |
| 290 (−70) | 353.753 (−6.247) |
| 300 (−60) | 357.211 (−2.789) |
| 310 (−50) | 358.997 (−1.003) |
| 320 (−40) | 359.753 (−.247) |
| 330 (−30) | 359.980 (−.020) |
| 340 (−20) | 360.004 (+.004) |
| 350 (−10) | 359.995 (−.005) |
| 360 | 0  360. 0 |

From these data, it is clear that the mechanism 176 is inherently capable of being configured to provide a long dwell with little output movement for a wide range of input angle, which is of great value for many applications. Other applications arise in which an even longer dwell is required or where it is desirable that no oscillation of the output occur during the dwell.

Both these objectives can be met by combining the mechanism 176, utilizing the higher harmonic additions with the differential cam mechanism 78 previously described. This is accomplished by directly coupling the output shaft 170 of mechanism 176 to the input shaft 30 of mechanism 78 and can also be represented by FIG. 19 by substituting mechanism 176 for mechanism 100. With output shaft 170 connected to input shaft 30, the behavior of the entire system, as represented by the movement of output shaft 48, is shown by curve F in FIG. 27. It will be noted that a true dwell in excess of ±75° has been achieved, which is much greater than the sum of the dwells of the two mechanisms operating independently. In effect, it only takes a relatively small modification to the E curve to achieve the F curve.

The dwell behavior of other types of motion generating mechanisms having an intermittent dwell can also be considerably enhanced by adding the differential cam mechanism 78 to their outputs. Several more examples will be shown.

The mechanism 200 (FIGS. 28–30) which also has a natural dwell, has been disclosed in my U.S. Pat. No. 4,018,090 and will be briefly described as follows. A case 202 supports a stationary shaft 204 on which in turn is mounted a stationary sun gear 206. A planetary carrier assembly is made up of a plate 208 and a housing 210 bolted thereto. The planetary carrier 208, 210 is mounted to the stationary shaft 204 through bearings 212 and 214 and rotates about the axis $A_0$. The periphery of the plate 208 is formed into a gear suitable for meshing with an input gear 216 mounted on a shaft 218 which rotates in bearings 220 and 222 mounted in the case 202.

A planetary gear 226 suitably formed to mesh with sun gear 206 is mounted on a planetary shaft 228 which in turn is carried in the planetary carrier 208, 210 through bearings 230 and 232. The planetary gear 206 rotates on the moving axis $A_1$ as the planetary carrier 208, 210 rotates about axis $A_0$ as driven by the input gear 216.

An eccentric support plate 234 is mounted to the planetary shaft 228 and has projecting therefrom an eccentric shaft 236 on an axis $A_2$ displaced from the axis $A_1$. A slide block 238 is rotatably mounted on the eccentric shaft 236; this slide block 238 in turn is slidably movable in a slot 240 of an output spider 242 (FIG. 30). This output spider 242 is mounted on an output shaft 244 which rotates in bearings 246 and 248 mounted in a case cover 250 fastened by bolts (not shown) to the case 202. The shaft 244 and output spider 242 rotate about an axis $A_3$ displaced from the primary axis $A_0$.

It can be seen that as the planetary carrier 208,210 rotates about the axis $A_0$, and the planetary shaft 228 is driven about the moving axis $A_1$, the eccentric shaft 236 an its axis $A_2$ move in an epitrochoidal or epicycloidal motion, depending on the amount of displacement of the axis $A_2$ from the axis $A_1$. Provided only that the axis $A_3$ lies within the path of the axis $A_2$, the eccentric shaft 236 and the slide block 238 cause the output spider 242 and output shaft 244 to rotate about the axis $A_3$. The mathematical development of the kinematics of this system is covered in my U.S. Pat. No. 4,018,090, with specific reference to the effects created through the displacement of the axis $A_3$ from axis $A_1$.

In the specific configuration shown in FIGS. 28–30, and applicable to a combination mechanism, the pitch diameter of the planetary gear 226 is equal to the pitch diameter of the sun gear, (R=1), and an output cycle repeats for every 360° rotation of the output shaft 244 and planetary carrier 208, 210. Further, if the eccentricity of axis $A_2$ to $A_1$ (K) approximates the pitch radius of the planetary gear 226 (K≅1), the output spider 242 and output shaft 244 will come to a stop or near stop once every 360°.

The specific configuration of FIG. 28 arbitrarily shows the eccentricity of axis $A_2$ to $A_1$ equal to the pitch radius of the planetary gear 226, (K=1) and arbitrarily shows the eccentricity of the axis $A_3$ to axis $A_0$ to be equal to one-half of the pitch radius of the planetary gear 226, along the master center line ($E_1$=0.5, $E_2$=0). Under these conditions, the displacement characteristic of the output shaft 244 relative to the displacement of the input, planetary carrier 208, 210, is shown by curve G of FIG. 27. It can be seen that there exists a momentary stop or dwell of the output once for each revolution. Here again this dwell can be significantly enhanced by combining the mechanism 200 with the differential cam mechanism 78 by directly coupling the output shaft 244 to the input shaft 30 as is again illustrated through FIG. 19. In this combination, the output shaft (48) displacement relative to the input displacement (planetary carrier 208, 210) is shown by curve H of FIG. 27.

The mechanism 260 shown in FIGS. 31, 32 and 33 is one embodiment of the mechanisms disclosed in my U.S. Pat. No. 3,730,014 and may also be used to advantage in combination with the differential cam mechanism 78. This mechanism 260 is configured to provide a 360° output cycle as is appropriate for this combination.

A case 262 supports a stationary shaft 264 on which is mounted an input assembly, comprised of gear 266 and input spider 268 journalled on the shaft 264 through bearings 270 and 272. The gear 266 is driven by an input gear 274 mounted on an input shaft 276 journalled in the case 262 through bearings 278 and 280.

The stationary sun gear 282 is directly mounted to the shaft 264 which also supports a planetary carrier assembly, made up of plates 284 and 286 connected by spacers 288, through bearings 290 and 292. The planetary carrier assembly 284-288 carries one or more planetary gears 294, each of which is mounted on a planetary shaft 296, journalled in the planetary carrier assembly 284-288 through bearings 298 and 300. Three such planetary gears are utilized although only one is shown in FIGS. 31-33, and each gear meshes with the stationary sun gear. At one end of each of the planetary shafts 296 is mounted an input eccentric 302 on an axis displaced from the axis of the associated planetary shaft. Each input eccentric 302 can rotate in a slide block 304 (FIG. 33) closely fitted in a corresponding slot 306 of the input spider 268.

At the other end of each planetary shaft 296 is mounted an eccentric support plate 308, a portion of which is formed into an output eccentric 310. A slide block 312 (FIG. 32) is rotatably mounted on each output eccentric 310 and is closely fitted into a corresponding slot 314 in an output spider 316. This output spider 316 is mounted on an output shaft 318 which rotates in bearings 320 and 322 mounted in a case cover 324 fastened by bolts (not shown) to the case 262. The output shaft 318 and output spider 316 rotate about the same axis as the axis of the sun gear 282 and on which the input spider 268 and planetary carrier assembly 284-288 also rotate, as must be when multiple planetary gears 294 are employed.

It can be seen that as the input spider 268 is driven by the gear 266 from input gear 274, the input spider drives the planetary gears 294 through the slide blocks 304 and input eccentrics 302. If it is assumed that the input spider rotates at constant angular velocity, the planets and planetary carrier assembly will rotate at a variable angular velocity due to the eccentricity of the drive point, i.e., the input eccentric. This is covered in mathematical detail in my U.S. Pat. No. 3,730,014. The planet gears 294 in turn drive the output spider through the output eccentrics 310.

In the specific configuration shown, the planet gears 294 are equal in size to the sun gear 282, and the axis of the output eccentric lies on the pitch diameter of the planet gears 294 ($R_1=1$). Therefore, the output spider and output shaft will come to a momentary stop or dwell once for each revolution of the output shaft and planetary carrier assembly. Furthermore, in the specific configuration shown, the input eccentric is on a radial line diametrically opposite from the radial line on which the output eccentric is located, and the input eccentric axis is displaced from the axis of the planetary gear a distance equal to 0.3 times the pitch radius of the planetary gear ($R_2=-.3$). Under these conditions, the planetary carrier assembly is rotating more slowly than the input spider, at the time in the cycle that the output eccentric axis lies on or near the pitch line of the sun gear. This has the effect of lengthening, in terms of time or input angle, the portion of the cycle that the output spider is stopped and in dwell, or on either side of this point near dwell.

Under these conditions, the displacement characteristics of the output shaft 318 relative to the displacement of the input spider 268 is shown by curve J of FIG. 34. Once again, the dwell of the natural mechanism 260 of FIGS. 31 to 33 can be significantly improved by combining it with the previously described differential cam mechanism 78, by coupling the output shaft 318 directly to the input shaft 30 as is again illustrated through FIG. 19. With this combination, the displacement of the system output shaft 48 relative to the input spider 268 is shown by curve K of FIG. 34. It will be noted that the curves of FIG. 34 are plotted only for one-half cycle (180°) for both the input and output; this is done because the movements are symmetrical about 180°.

If the input eccentricity is reduced to zero by moving the input eccentric 302 to the axis of the planet gear 294, there will exist no relative movement of the input spider relative to the planetary carrier assembly 284-288. In a design of this type the input spider may be eliminated and the mechanism simplified as shown in mechanism 330, FIG. 35.

Referring to FIG. 35, a case 332 supports a stationary shaft 334 on which is mounted the sun gear 282 and the planetary carrier assembly is again made up of plates 284 and 286 and spacers 288. In this case a gear 336 is directly bolted to the planetary carrier assembly for driving; the gear 336 is driven by the input gear 274 mounted on the input shaft 276 journalled in the case as before.

The remainder of mechanism 330, FIG. 35, is identical with the mechanism 260, FIG. 31, except that the input eccentric 302 is deleted on the planetary shaft 296, since the planetary carrier assembly is now driven directly by the gear 336. In the configuration shown, the planet gear is again equal in size to the sun gear, and the axis of the output eccentric lies on the pitch diameter of the sun gear. Therefore, the output spider and output shaft will come to a momentary stop or dwell once for each revolution of the output shaft and planetary carrier assembly.

Under these conditions, the displacement characteristics of the output shaft 318 relative to the displacement of the planetary carrier assembly as the input is shown by curve L of FIG. 34. Recalling that curve J indicates the input output characteristics of the mechanism 260 with an input eccentric, it is clear that the difference between J and L is caused by effect of the input eccentric. Even though the dwell of the mechanism 330 is somewhat less than the dwell of the mechanism 260, it too can be significantly improved by again combining it with the differential cam mechanism 78. As before, and as is illustrated in FIG. 19, the output shaft 318 is directly coupled to the input shaft 30. With this combination, the displacement of the system output shaft 48 relative to the planetary carrier assembly is shown by curve M of FIG. 34.

In the mechanisms 200, 260 and 330 of FIGS. 28, 31 and 35, respectively, the nature of the natural dwell is controlled by the eccentricity of the output eccentric relative to the pitch line of its associated planetary gear. If this eccentricity is exactly equal to the pitch radius of its planetary gear, the output shaft will come to a momentary stop once each revolution. If this eccentricity is slightly less than the pitch radius of the planetary gear, the output will come to a near stop, the minimum velocity being related to the difference of the eccentricity from the planetary gear pitch radius. And if this eccentricity is slightly greater than the pitch radius of the planetary gear, the output will go through a slight displacement reversal at the dwell. In all three cases, the addition of the differential cam mechanism, in the configuration shown, will significantly improve the dwell in terms of its length as measured by the input angle, and in converting the near stop, momentary stop, or displacement reversal into an exact non-reversing true dwell.

Similarly, the mechanism 100 of FIGS. 13 and 14 can be configured to provide a near stop, a momentary stop, or displacement reversal once each revolution, and the mechanism 176 of FIGS. 20 and 21 can be configured to provide a near stop, a momentary stop, or one or two displacement reversals once each revolution. In all cases, the addition of the differential cam mechanism can convert these various situations into a true dwell of significant length.

While the primary intent and application of the addition of the differential cam mechanism to these natural cyclic mechanisms is to improve their dwell characteristics, it is also true that this addition can also be utilized to modify other kinematic characteristics of the natural cyclic mechanisms, such as reducing peak accelerations, creating a long constant velocity portion, or other desired effect, within the modifying capabilities of the differential cam mechanism.

In the basic differential cam mechanism 78, FIGS. 5–9, the input shaft and the output shaft were shown as operating on the same axis. In some cases, in which it is desired to change the effective leverage through the bellcrank from the cam to the output arm, as when the output load varies with position in the cycle, it can be advantageous to introduce an offset between the input shaft and output shaft axes. This requires a mechanical modification by eliminating the bearing 52 and adding another bearing between the output shaft 48 and the cover plate 44.

Referring to FIG. 7, the slot 64 in the output arm 58 was shown as being on a radial centerline. This also need not be. Inclining this slot relative to a true radial line may be employed to introduce a non-symmetrical response in the differential angle relative to the cam generated displacement of the bellcrank link 68; there the differential angle is defined as the angle between the input shaft and the output shaft away from their base relationship.

When larger differential angle ranges are required, and lower torques are acceptable relative to cam loading, the bellcrank link to output arm connection may be revised as shown in FIG. 36 which is analogous to FIG. 7 of the first embodiment. The input arm 40 and crank pin 42 are utilized as in the original embodiment, FIGS. 5–9. A revised bellcrank link 340 is pivoted on the crank pin 42 through bushing 70; at its outboard end the bellcrank link 340 again supports the cam followers 76 as before, and is driven through it by the cam groove. The bellcrank link 340 further supports a gear sector 342 having its center of curvature coincident with the axis of the crankpin 42. In place of a slotted output arm 58 previously employed, an output sector gear 344 is splined on the output shaft 48 for driving. Gears 342 and 344 are formed and positioned for a driving relationship; it can be seen, therefore, that as the cam follower 76 is driven by the cam groove, the rotation of the bellcrank link 340 about crankpin 42 causes a change in the differential angle between the input and out-put-shafts. It can further be seen that for a given angular movement of the bellcrank link 340 about the crankpin 42 caused by a given cam radius difference, a larger differential angle is generated than with the embodiment of FIGS. 5–9.

If, on the other hand, smaller differential angle ranges are acceptable and higher torques are desired relative to the cam loading, the bellcrank link to output arm connection may be inverted relative to the embodiment of FIGS. 5–9. Such an inversion is shown in FIGS. 37 and 38. In this case, the slider block to output arm connection is made on a radius from the centerline of rotation which is larger than the radius of the crankpin from that same axis. Referring to FIGS. 37 and 38, a revised bellcrank link 350 is again pivoted on a crankpin 42; the crankpin again being mounted on the crank arm 40A which is altered only to provide more clearance for the bellcrank relative movement. At its one end the bellcrank link 350 carries the cam follower roller 76 which engages the cam groove 46, as before. At its other end, the bellcrank link 350 has mounted in it a pin 352 on which is pivotally mounted a slider block 354 through a bushing 356. This slider block 354 is closely fitted in a slot 358 in the output arm 360 which is again splined on the output shaft 48. It will be noted that in this embodiment the slider block to output arm driving connection is at a much greater relative radius than was the case in the embodiment of FIGS. 5–9. Therefore, for a given angular movement of the bellcrank link about the crank pin, as caused by a given cam groove radius difference, the differential angle generated between the input crank arm and the output arm is less than in the embodiment of FIGS. 5–9.

Another reversal of the bellcrank connection between the input arm (formerly the crank arm) and the output arm is shown in the embodiment of FIG. 39. In this instance the bellcrank link 370 is pivotally connected to the output arm 372 through a pin 374 at its one end and carries the cam follower roller 76 at its other end. This bellcrank link is driven through a slider block 376 and pin 378 by a slotted input arm 380.

In all of the embodiments shown, it can be seen that when there is no variation induced by the cam, the input arm and output arm operate in unison or synchronously, and that any movement caused by the cam through a relative rotation of the bellcrank link causes a differential movement of the output shaft relative to the input shaft as opposed to the more conventional system in which the cam must generate the entire output movement.

I claim:
1. In a rotary motion control mechanism involving a predetermined variable angular relationship between two rotating members, capable of providing a wide variety of kinematic objectives in the movement of an output shaft relative to the movement of an input shaft, including a very long dwell of said output shaft during the rotation of said input shaft, a tandem drive system comprising:
(a) a frame,
(b) a first drive system comprising a rotary motion control mechanism in said frame comprising:
  1. a varying ratio gear train driven by said input shaft,
  2. an output shaft journalled in said frame and driven by said varying ratio gear train,
(c) a second drive system comprising:
  1. an input shaft member journalled in said frame, rotating on a first axis, and driven by the output shaft of said first drive system,

2. offset driving means mounted on said input shaft member,
3. an output shaft member journalled in said frame and rotating on a second axis substantially parallel to said first axis,
4. offset driven means mounted on said output shaft member,
5. stationary annular plate cam means mounted on said frame in a plane substantially perpendicular to said first axis and said second axis and encompassing said first axis and said second axis, and
6. cam follower means operatively associated with said plate cam means and interconnecting said offset driving means and said offset driven means, whereby a movement generated by said plate cam means in said cam follower means creates a substantially proportional movement of said driven means relative to said driving means.

2. A rotary motion control mechanism as in claim 1, in which said first drive system comprises:
(a) an output member connected in an operating relationship with said input shaft member of said second mechanism,
(b) a drive surface on said output member,
(c) a rotary member to engage said drive surface in a tangential drive relationship,
(d) means mounting said output member to guide said drive surface in a predetermined path,
(e) means mounting said rotary member for rotational motion about its moving center and in driving engagement with said drive surface of said output member,
(f) a rotative drive member,
(g) means mounting said rotative drive member for movement in a path generally transverse of said path of said drive surface of said output member,
(h) means mounting said rotary member in non-rotational relation to said drive member with the axes of said rotary member and said drive member parallel but spaced from each other wherein power rotation of said drive member causes it to rotate about the moving center of said rotary member, and
(i) means to drive one of said members to impart a rotation to said rotary member while in driving relationship with said drive surface.

3. A rotary motion control mechanism as in claim 1, in which said first drive system comprises:
(a) a frame,
(b) an output member adapted for tangential drive and supported by said frame for rotation, and connected in an operating relationship with said input shaft member of said second mechanism,
(c) a first rotating pair supported by said frame comprising:
 1. a first rotating member mounted for rotation in said frame,
 2. a first eccentric member mounted eccentrically, in non-rotational relation to, and on said first rotating member,
(d) a second rotating pair mounted in fixed spatial relationship with said first rotating pair comprising:
 1. a second rotating member,
 2. a second eccentric member mounted eccentrically in non-rotational relation to, and on said second rotating member,
(e) means connecting for rotation said first rotating pair and said second rotating pair for substantially an integral angular velocity ratio,
(f) means connecting said main output member with said first eccentric member and with said second eccentric member comprising:
 1. a first output member in tangential driving engagement with the periphery of one of said eccentric members,
 2. a second output member rotatably mounted to the other of said eccentric members, and
(g) power means connected to one of said rotating pairs to impart a rotary motion to that of said rotating pair.

4. A rotary motion control mechanism as in claim 1, in which said first drive system comprises:
(a) a frame,
(b) a circular reaction member mounted in said frame and concentric about a first axis,
(c) a first rotating member mounted for rotation in said frame and rotating about said first axis,
(d) a second rotating member of the same diameter as said circular reaction member mounted for rotation on said first rotating member and rotating about a second axis displaced from said first axis and adapted for tangential driving engagement with said circular reaction member,
(e) an eccentric member mounted on said second rotating member concentric about a third axis displaced from said second axis,
(f) an output member mounted for rotation in said frame and rotating about a fourth axis displaced from said first axis and in driven engagement with said eccentric member, and connected in an operating relationship with said input shaft member of said second mechanism, and
(g) input power means driving one of said rotating members.

5. A rotary motion control mechanism as in claim 1, in which said first drive system comprises:
(a) a first support member,
(b) an input member rotatably mounted in said support member,
(c) an output member rotatably mounted in said support member and on the same axis as said input member, and connected in an operating relationship with said input shaft member of said second mechanism, and
(d) an intermediate means connecting said input member to said output member comprising:
 1. a stationary circular reaction member on the same axis as said input member and said output member,
 2. a planetary carrier frame rotatably mounted in said support member,
 3. one or more planetary members mounted in said planetary carrier frame positioned to roll without slipping on said circular reaction member in a planetary configuration,
 4. an input shaft extending from each said planetary members, the axis of each said shaft being parallel to, but displaced from, the axis of each said planetary member,
 5. means connecting said input member to each said input shaft,
 6. an output shaft extending from each said planetary member, the axis of each said output shaft being parallel to the axis of each said planetary member, and
 7. means connecting said output member to said output shaft.

6. A rotary motion control mechanism as in claim 1, in which said first drive system comprises:
(a) a first support member, (b) an output member rotatably mounted in said support member, and connected in an operating relationship with said input shaft member of said second mechanism, and
(c) input means rotatably mounted in said support member and on the same axis as said output member comprising:
1. a stationary circular reaction member on the same axis as said output member,
2. a planetary carrier frame rotatably mounted in said support member,
3. one or more planetary members mounted in said planetary carrier frame positioned to roll without slipping on said circular reaction member in a planetary configuration,
4. an output shaft extending from each said planetary members, the axis of each said output shaft being parallel to the axis of each said planetary member, and
5. means connecting said output member to each said output shaft.

* * * * *